US008020686B2

(12) United States Patent
Babineau et al.

(10) Patent No.: US 8,020,686 B2
(45) Date of Patent: Sep. 20, 2011

(54) RECYCLING AND ENVIRONMENTAL DEBRIS CHUTE

(75) Inventors: Richard A. Babineau, Laconia, NH (US); Glenn Walker, Chichester, NH (US)

(73) Assignee: Enviro Chute LLC, Chichester, NH (US)

( * ) Notice: Subject to any disclaimer, the term of this patent is extended or adjusted under 35 U.S.C. 154(b) by 274 days.

(21) Appl. No.: 12/434,902

(22) Filed: May 4, 2009

(65) Prior Publication Data

US 2010/0276247 A1 Nov. 4, 2010

(51) Int. Cl.
*B65G 11/00* (2006.01)

(52) U.S. Cl. .......... 193/2 R; 193/3; 193/25 FT; 193/2 D

(58) Field of Classification Search .................. 193/2 R, 193/3, 25 FT, 2 D; 141/10, 114, 314, 316; 229/161, 931; 248/99
See application file for complete search history.

(56) References Cited

U.S. PATENT DOCUMENTS

| | | | | |
|---|---|---|---|---|
| 435,638 A | | 9/1890 | Barnes | |
| 1,234,057 A | * | 7/1917 | McIntyre | 141/314 |
| 3,961,706 A | * | 6/1976 | Roccaforte et al. | 206/736 |
| 4,022,372 A | * | 5/1977 | Graser | 206/193 |
| 4,312,531 A | | 1/1982 | Cross | |
| 4,817,803 A | * | 4/1989 | Risucci | 229/101.2 |
| 4,979,547 A | * | 12/1990 | Hoerner | 141/390 |
| 4,981,274 A | | 1/1991 | McVay et al. | |
| 5,205,107 A | | 4/1993 | Herink | |
| 5,308,027 A | | 5/1994 | Fullilove | |
| 5,785,369 A | | 7/1998 | Ridley, Sr. et al. | |
| D401,027 S | | 11/1998 | Mueller | |
| 6,132,349 A | * | 10/2000 | Yokoyama | 493/86 |
| 6,151,875 A | | 11/2000 | Collins | |
| 6,293,505 B1 | | 9/2001 | Fan | |
| 6,378,577 B1 | | 4/2002 | Piner et al. | |
| 6,708,742 B2 | | 3/2004 | Weathers et al. | |
| 2005/0218674 A1 | | 10/2005 | Weathers et al. | |
| 2006/0261616 A1 | | 11/2006 | Weathers et al. | |
| 2008/0052869 A1 | | 3/2008 | Fanning | |

OTHER PUBLICATIONS

Dano Inc., Ecolo-Chute Folding Instructions.

* cited by examiner

*Primary Examiner* — Leslie A Nicholson, III

(74) *Attorney, Agent, or Firm* — Daniels Patent Law PLLC; Scott A. Daniels

(57) ABSTRACT

A method and apparatus for a recycling and environmental debris chute that directs leaf, debris and recycling or other materials into a container for collection, and more particularly a foldable chute formed from a single sheet of material and insertable into a collection bag or flexible container to hold the bag or container open in an upright or laying down sideways position and facilitate directing leaves, debris and other material into the bag or container.

18 Claims, 8 Drawing Sheets

RECYCLING AND ENVIRONMENTAL DEBRIS CHUTE

FIELD OF THE INVENTION

The present invention relates to an apparatus for facilitating leaf, debris and recycling collection, and more particularly to a foldable chute formed from a single sheet of material having a series of distinct scores, cuts, die cuts, seams and folds to define the chute, and where the chute is inserted in a flaccid paper or plastic collection bag or similar debris or recycling receiving container to support the bag or container in an open and upright, or even prone, position to receive and collect leaves, debris and other material in the bag or container.

BACKGROUND OF THE INVENTION

Currently local municipalities have enacted laws prohibiting the dumping or burning of leaves and other debris and are tending to promote the recycling of plastics, glass, paper and other materials including yard waste such as leaves and grass clippings etc. Collection of such materials is often accomplished by the use of paper or plastic bags which are then collected by the local municipality for recycling or disposal. The user must therefore fill these paper or plastic bags with material prior to collection. Such paper and plastic bags are inherently very light and flaccid in that the user may have a difficult time maintaining the bags in an upright or open material receiving configuration. This makes it accordingly difficult for the user to deposit and collect materials in the bags.

Methods of maintaining these bags in such an open receiving configuration are known and include using funnels and inserts to hold open and assist in the filling of such collection bags and containers. The use of such a funnel apparatus that is formed with an upper and a lower channel portion which allows the raking of the debris into the container with the container positioned on its side is described in U.S. Pat. No. 6,708,742 and U.S. Pat. No. 4,312,531. A similar apparatus that has both a passage and a handle to grip and pull up the apparatus to scoop the debris into the container is described in U.S. Pat. No. 5,785,369.

In U.S. Pat. No. 5,205,107, a more elaborate apparatus that has a base, side plates, hinges, and clamps that are folded, fitted and attached together allows construction of a device that is positioned on the ground in front of a container laid on its side providing a method to rake leaves, twigs and heavier debris into the container is described. Other designs include metal or plastic frames formed from tubular material into circular or rectangular shapes. The frames are inserted in the opening of the container to hold the container in an open position as described in U.S. Pat. Nos. 4,981,274, 6,293,505 and in U.S. Pat. No. 5,308,027.

Each of the apparatus described present limitations in maneuvering the apparatus into the opening of the bag or container because of the overall size and weight of the apparatus and in the storage of the apparatus in a limited amount of space since most require some disassembly of components to reduce the space taken up by the apparatus. The numerous components of some of the described apparatus also add to manufacturing costs and subsequently to the expense to do the job of filling a container, a job that is usually done without an apparatus by the conventional methods of raking and manually scooping up the leaves and debris and dumping them into the container.

In order to address these limitations the present invention provides an easy to manufacture, easy to operate in set-up, use and breakdown as well as compact storage and inexpensive chute apparatus formed from a single sheet of material that makes collecting leaves and debris in flexible bags or containers quicker and easier.

OBJECT AND SUMMARY OF THE INVENTION

The present invention is directed to a chute apparatus formed from a single sheet of material that folds and creates an upper chute portion and a lower insert portion. The insert portion is particularly directed to being inserted in a bag or flexible container and providing stability to hold the bag or container open in an upright or laying down sideways position allowing leaves and debris to be easily raked or scooped and filled into the container. The single sheet is thick durable plastic of sufficient tensile strength to provide structural support to the container and rigidity to the front and side walls of the container allowing compression of debris within the container without damage or deformity to the flexible container. The ability to compress the debris and contents of the container provides increased volume to the container and reduces the number of containers required.

The chute apparatus is a tri-fold sheet that when correctly folded forms a three sided box on the lower insert portion from a transverse cut through the sheet and an upper portion that folds in an opposite direction relative to the lower portion and forms an inclined three sided chute portion. The three sided box of the lower insert portion creates a stable freely standing frame that can be inserted into a flexible container and provide stability to hold the flexible container open and in an upright or laying down, prone position. The three sided chute portion forms a scoop that is arranged angularly relative to the sides of the three sided box of the lower insert portion. The chute is formed from angular folds that extend from the transverse cut along each side of the chute and form an incline to direct debris from the top of the chute to the insert portion that is inserted into a flexible container.

The tri-fold sheet of material is formed with horizontal fluting that is arranged perpendicular to the major longitudinal scores and folds of the apparatus. This fluting provides strength, elasticity to the scores and enhanced durability. Fluting along the folds in a vertical direction would cause false creasing and abnormal wear, thereby deteriorating the structural integrity and create failure of existing folds. Each fold or score formed in the sheet of material may even be double scored and may include die cut vent holes to aid in flexibility of the plastic and allow easier creasing along the folds. The bottom edge of the plastic sheet has rounded edges to aid in inserting the chute apparatus into the flexible container and prevent punctures and tears of the container. The chute apparatus may be formed from high density fluted polyurethylene (HDPE), or similar rigid high density plastics of a range in thickness from about 4 mm-6 mm. It is to be appreciated that other thicknesses may be used in fabricating the apparatus to some extent dependent upon the type of sheet material used to make the apparatus.

An important object of the present invention is to provide a chute apparatus or device which when used with a paper, plastic or cardboard container, provides effective means for positioning and stabilizing the flexible bag, protecting the bag or container against destructive tears and the like, and providing guidance means which facilitates a direct introduction of debris into the bag or container.

Another important object of the present invention is to provide structural integrity to the front and sides of the flexible container to allow compression of the debris or other material within the container.

Another important object of the present invention is to provide an easy to fabricate design from a single sheet of material to form a cost effective chute apparatus for flexible containers.

The present invention relates to a chute apparatus for facilitating the collection of debris within a receiving container, the apparatus comprising a single sheet of material having first and second scores formed therein extending the length of the single sheet of material to define a respective first and second fold axes, first, second and third adjacent panels defined by the first and second scores, a cut formed perpendicular to the first and second scores and extending from a first end position in the first panel across the second panel to a second end position in the third panel, a first angular score extending from the first end position of the cut in the first panel to an outer edge of the single sheet of material, and a second angular score extending from the second end position of the cut in the third panel to the outer edge of the single sheet of material, two scored folds at an angle to and above the slot cut through the single sheet of material, and where a portion of the first and second scores, the first and second angular scores and the cut define an upper chute portion of the chute apparatus and the remaining portion of the first and second scores and the first, second and third panels form a lower insert portion of the chute apparatus.

The present invention also relates to a method of making a chute apparatus for facilitating the collection of debris within a receiving container comprising the steps of forming a single sheet of material having first and second scores formed therein extending the length of the single sheet of material to define a respective first and second fold axes, defining a first, second and third adjacent panels by the first and second scores, cutting the single sheet of material perpendicular to the first and second scores and extending from a first end position in the first panel across the second panel to a second end position in the third panel, indenting a first angular score extending from the first end position of the cut in the first panel to an outer edge of the single sheet of material, and a second angular score extending from the second end position of the cut in the third panel to the outer edge of the single sheet of material; and bending the single sheet of material along a portion of the first and second scores, the first and second angular scores and the cut to define an upper chute portion of the chute apparatus and bending the remaining portion of the first and second scores of the first, second and third panels to form a lower insert portion of the chute apparatus.

These and other features, advantages and improvements according to this invention will be better understood by reference to the following detailed description and accompanying drawings.

DETAILED DESCRIPTION OF THE INVENTION

Figure 1:
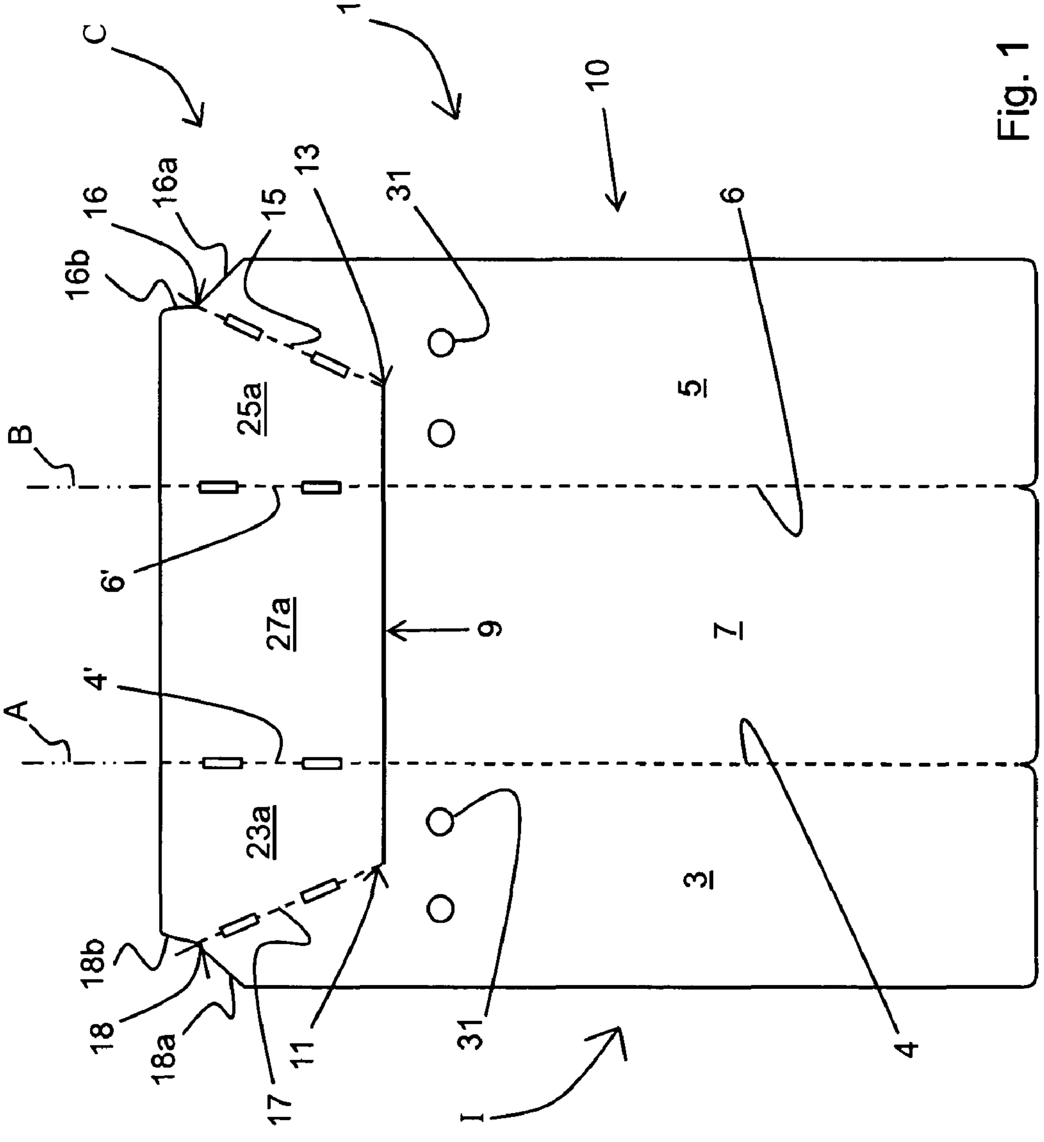
FIG. 1 is an elevational view of the single sheet of material that forms the chute apparatus.

As described briefly above in the Brief Description of the Drawings and Object and Summary of the Invention, the present invention is directed to a foldable chute apparatus for filling a flexible, flaccid container generally fabricated from paper or plastic. In general as shown in FIG. 1, the foldable chute apparatus 1 consists of a single sheet of material cut and scored in such a manner as to define three main panels, end panels 3, 5 and center panel 7. It is to be understood that by the terms "cut" and "scored", a cut generally refers to material separation that extends through the thickness of the material. A cut may define either a passage through the material where material is removed to define an opening, or alternatively the cut may not remove material but merely extend through the material such that the material on either side of the cut is still in friction contact. The term "score" or "scored" generally may refer to a cut or indent that does not penetrate completely through the material. A "score" does not have to be a separational cut in the material either, but may merely be an indent formed in the material so as to create a seam which permits the material to be folded more easily along the seam.

The panels 3, 5 and 7 are separated by intermediate scores 4 and 6 so as to define a tri-fold single sheet of material 10 where the scores 4 and 6 permit relative foldable movement of the three panels 3, 5 and 7 relative to one another along the scores 4 and 6. As will be described in greater detail below, the main panels 3, 5 and 7, the scores 4 and 6 along with certain other scores and cuts discussed below, permit the single sheet of material 10 to be folded in such a manner as to form the foldable chute apparatus 1.

Figure 2:
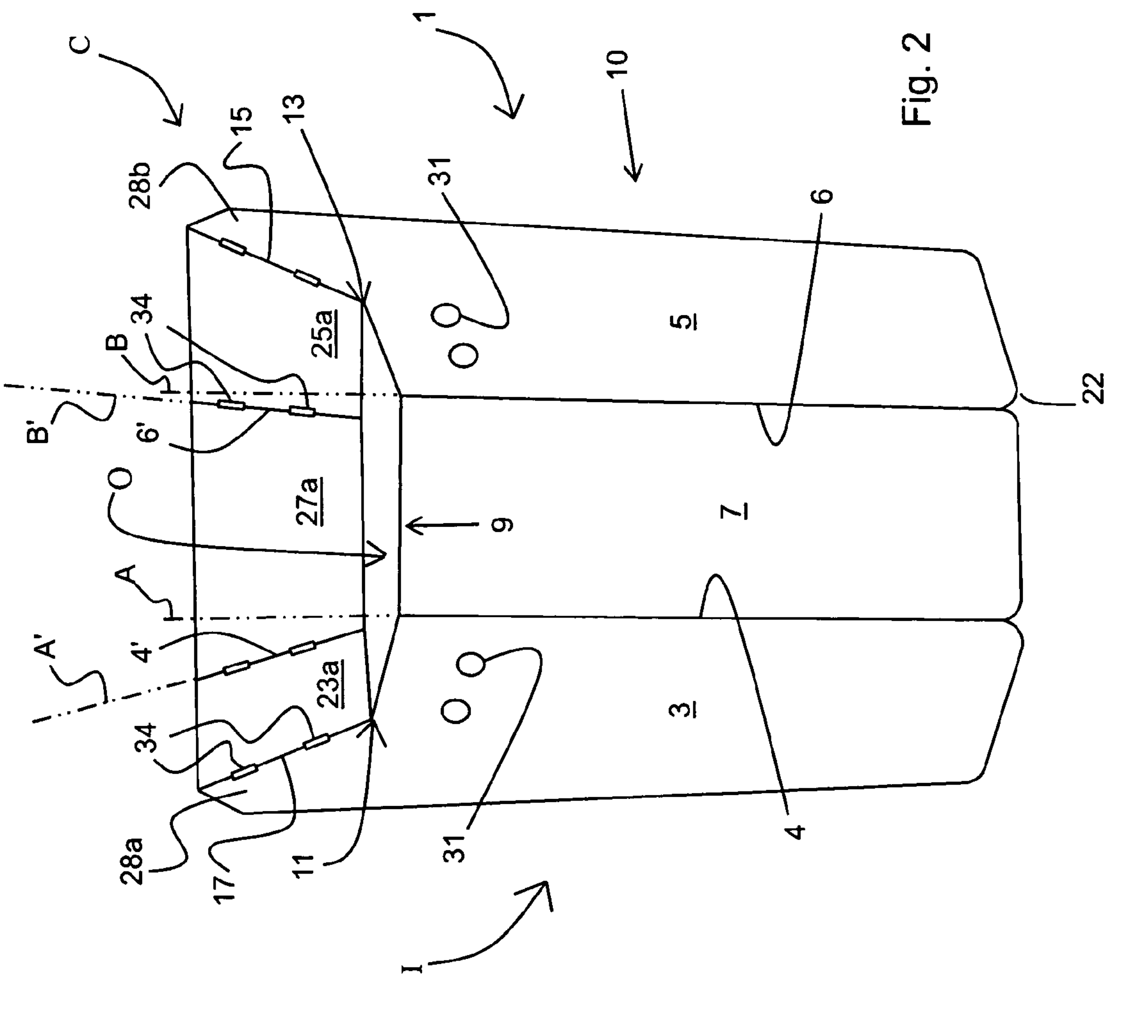
FIG. 2 is a perspective view of the chute apparatus in a partially folded configuration.
Figures 3, 3A:
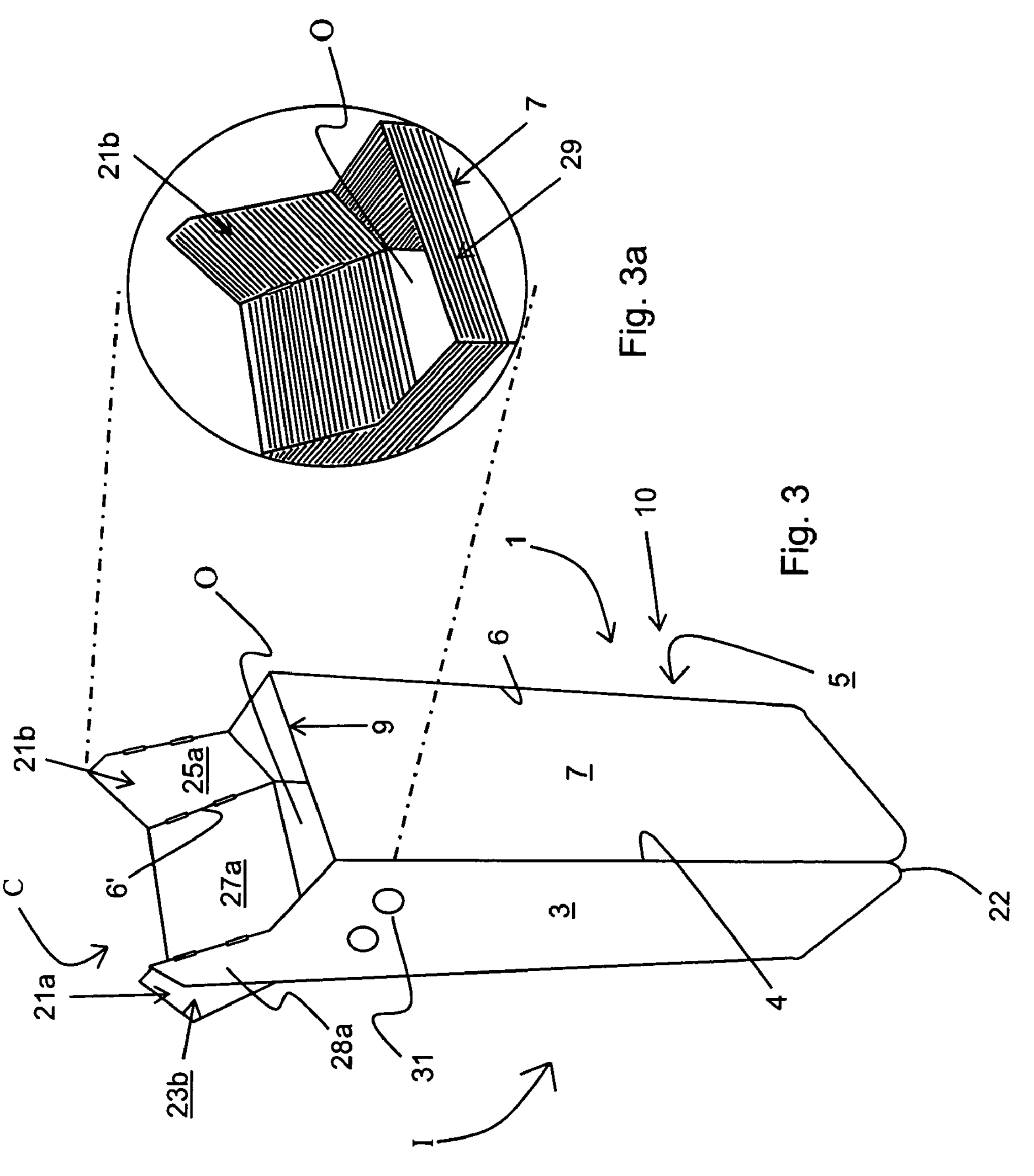
FIG. 3 is a perspective view of the front side of the chute apparatus folded.
FIG. 3A is a partial view of the fluting arrangement of the corrugated material of the present embodiment.

Observing the single sheet of material 10 as shown in FIG. 1, the scores 4 and 6 define longitudinal fold axis A and B respectively and the single sheet of material 10 is further provided with additional cuts and scores to define a chute opening O. The chute opening O which is more clearly seen in the following description and FIGS. 2 and 3, is initially defined by a lateral opening cut 9 formed in a perpendicular direction with respect to the axis A and B and scores 4 and 6. The opening cut 9 has two end points 11 and 13 between which the opening cut 9 extends across the three main panels 3, 5 and 7. The end points 11 and 13 are each located approximately intermediate of the main panels 3 and 5 so that the cut 9 extends entirely across the center panel 7 through the longitudinal scores 4 and 6, and partially across respective end panels 3 and 5 of the single sheet of material 10. The portion above the opening cut 9 will form the chute portion C of the apparatus, while the portion of the single sheet of material 10 below the opening cut 9 will form the insert portion I of the apparatus. As discussed in further detail below, when the apparatus is folded into its operable position the opening cut 9 will specifically define the chute opening O and the corresponding separation of the chute portion C from the insert portion I of the apparatus.

To facilitate the formation of the chute opening O and the inherent separation of the chute portion C from the insert portion I in the folding of the apparatus, an angular score 15, and a corresponding angular score 17, are each provided in the chute portion of the end panels 3 and 5. Angular score 15 extends from endpoint 13 of the opening cut 9 at an angle of between about 10 and 60 degrees, and more preferably about 15-30 degrees, relative to the longitudinal axis A, B, to a fold corner 16 in end panel 5. The fold corner 16 is further defined by first and second inwardly extending angular edges 16*a*, 16*b* which essentially form the corner 16 as an obtuse angled relief in the outermost profile edge of the apparatus. This relief is important because in defining the fold corner 16, along with the angular score 15, the chute portion C and opening O can be more easily formed because the apex of the obtuse angled relief which forms the corner 16 aligns directly with the angular score 15 and facilitates bending along the score line. Similarly, a relief is also formed in the chute portion C of end panel 3 to define fold corner 18 and by first and second inwardly extending angular edges 18*a*, 18*b*. These oppositely disposed fold corners 16 and 18 at the apex of the obtuse angles, along with the relief and the angular scores 15, 17, enable the chute portion C of the device to be easily and quickly formed when the apparatus is folded into and out of its operable position.

As discussed above, the opening cut 9 and angular scores 15, 17 separate the flat single sheet of material 10 into the upper chute portion C and the lower insert portion I. Turning to FIG. 2 and initially observing the upper chute portion C, the various scores and cuts also define in the chute portion C a number of different front, or inner surfaces which are essentially subsurfaces of the panels 3, 5 and 7. The inner surface of the chute portion C includes; a chute center surface 27*a* and chute side surfaces 23*a* and 25*a*. As seen here in FIG. 2, with the apparatus now being folded slightly about the scores 4 and 6, the opening O becomes readily apparent. The opening O is thus understood to be further defined by the lower insert portion I of the apparatus being folded in the opposite direction from the chute portion C. In other words the lower insert portion I is folded forward about the respective scores 4, 6, i.e. out of the page toward the reader, while the upper chute portion C is folded backwards about the respective scores 4, 6 as well as angular scores 15, 17, i.e. into the page and away from the reader. The angular scores 15, 17 are critical in that the relative angled nature of these scores 15, 17 with respect to the opening cut 9 cause the upper chute portion C to be angled relative to the longitudinal nature of the lower insert portion I as the apparatus is folded into its operable condition. In other words, where the scores 4, 6 of the insert portion I are still aligned along longitudinal axes A, B, the portion of these scores now on the chute portion, now shown as 4' 6', are angled along an axis A', B' relative to the axis A, B.

Another important aspect of the present invention is the use of the die cut openings 34 along the scores 4', 6' as well as the angular scores 15 and 17. The die cut openings 34 are portions of the seam defined by the scores where material is not merely cut or indented, but actually removed so as to define an elongate opening extending along the scores 4', 6', 15 and 17. In an embodiment of the present invention shown in FIG. 2A, each score 4, 6, 4', 6', 15 and 17 may be formed by double scores, in other words not merely one linear indentation but two closely adjacent and parallel linear indentations D, E, essentially form double scores at each bend or fold in the material. These double scores D, E, are important as each of the adjacent linear and parallel indentations takes up, or absorbs, a portion of the angle between the relative panels so that one single indentation does not have to absorb the entire mechanical stress tension of the bend or fold. This sharing of the bend stress and tension at each fold enables the material to last longer where the apparatus is subject to a significant number of bending operations and substantial use. This is because the stress of the fold or bend is absorbed by both the closely adjacent indentations, i.e. double scores D, E, rather than just a single score line.

Figure 2A:
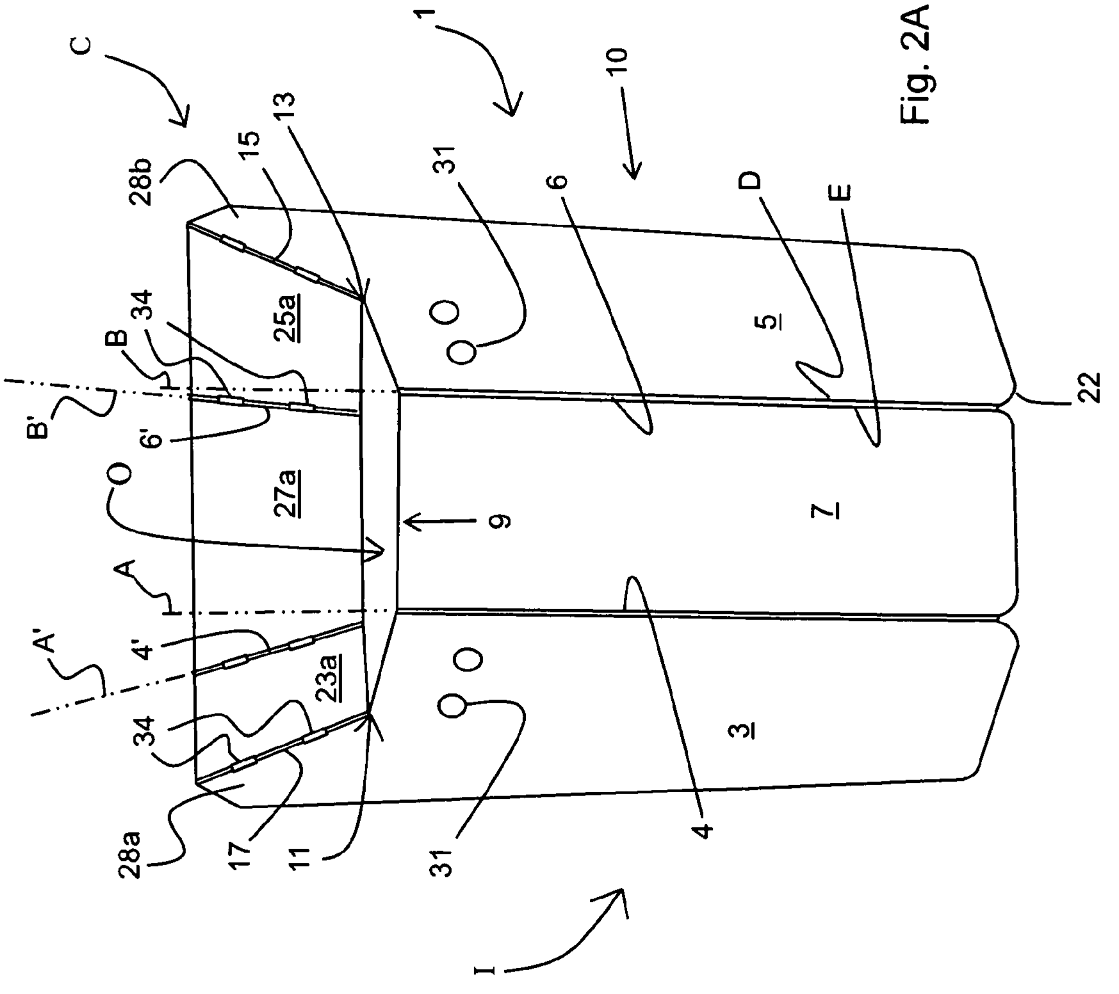
FIG. 2A is a perspective view of a second embodiment of the chute apparatus in the partially folded configuration.

Also, an opening 31 or set of openings may be formed in the end panels 3 and 5 to allow a user to insert their fingers to easily grip the apparatus 1. FIGS. 2 and 2A show the apparatus 1 as having the single sheet of material 10 partially moved from its flat, planar configuration towards having the chute portion C slightly folded backwards along the scores 4', 6', 15 and 17, and the lower insert portion I partially folded forwards along scores 4, 6. The fold along the left angular score 17 folds an end panel extension 28*a* adjacent the left chute wall 23*a*, and similarly along score 15 folds another end panel extension 28*b* adjacent the right chute wall 25*a* where these angular folds along the angular scores 15 and 17 further define the respective end panel extensions 28*a* and 28*b* to provide support and stability to the entire upper chute portion C.

The scores 4' and 6' facilitate the left chute side wall 23*a*, the right chute side wall 25*a* and chute center surface 27*a* to bend and fold backward relative to the lower insert portion I creating the opening O between the upper chute portion C and lower insert portion I. As discussed above, the angular scores 15, 17 and scores 4', 6' may include the die cut holes 34 that are cut through the single sheet of material 10 along the scores to aid in the ease of folding and unfolding of the single sheet material 10.

The chute apparatus 1 is shown completely folded into its operable position in FIG. 3. The left angular extension 28*a* is now doubled up against the backside 23*b* of side chute wall 23*a* (All back, or rear surfaces of the previously denoted and referenced elements of the chute apparatus will be denoted with the same reference number as the previously discussed front surfaces but with "b" indicating the back surface.) wrapped over the left chute flap 21*a* and a portion of the back surface 23*b* of side chute wall 23*a* is jutting out from the angular formation of the chute portion C. FIG. 3 also shows the complete formation of the essentially rectangular opening O between the upper chute portion C and lower insert portion I. Upon folding of the chute apparatus 1 into its operable position shown here, and insertion of the chute apparatus 1 in a flexible container, the opening O allows debris to be directed down the angled upper chute portion C and into the flexible container. In another important aspect of the present invention the bottom corners 22 of each of the panels 3, 5 and 7 is chamfered or rounded to allow easy insertion of the insert portion I of the chute apparatus 1 into the flexible container without tearing or damaging the container.

This specific structure and arrangement of the chute apparatus 1 provides for a stable and rigid structure for supporting flaccid paper and plastic bags. Besides the angled upper chute portion C and the support provided along its sides by extensions 28*a* and 28*b*, the formation of what is essentially a three sided box by the panels 3, 5 and 7 forming the lower insert portion I forms a stable foundation which permits the chute apparatus 1 to be self-supporting when setup in its operable condition either in a stand-alone position or more specifically when inserted inside a flexible container such as a recycling or paper leaf bag. The chute apparatus 1 and the various scores also have some elasticity due to the rigidity of the specific plastic, cardboard or paper material from which it is formed, the panels 3, 5 and 7 inherently want to return to their flat initial configuration and thus even when folded in the operable position inside a paper or plastic bag, the panels 3 and 5 will push outwards on the bag, which correspondingly helps maintain the bag in an open and upright configuration and the apparatus in a stable operable position. The three sided box configuration formed by the panels 3, 5 and 7 forms a substantially rigid surface, as opposed to the paper or plastic bag walls, that is not easily deformed or bent and thus provides a stiffer surface to allow more compression of the debris or other materials collected in the flexible container.

Additionally, it is another important aspect of the present invention that where the chute apparatus 1 is fabricated from a high density corrugated polyurethylene (HDPE) the longitudinal flutes formed by the corrugation of the HDPE material run laterally across the chute apparatus, i.e. perpendicular to the axes A, B. With the flutes 29 as seen in FIG. 3*a* running perpendicular to the longitudinal scores and axes A, B the specific design and arrangement of the fluting provides greater rigidity to the chute apparatus, as well as greater elasticity to the scores which again assists the apparatus to push outward on the bags to maintain the cooperation and rigidity of the collection bag and chute apparatus during filling operations. Also, by forming the apparatus with the fluting in a perpendicular direction to the folds along the scores of the apparatus, the likelihood of false creasing, i.e. the apparatus creasing or folding somewhere other than an indented score line of the single sheet material 10, is greatly reduced.

Figure 4:
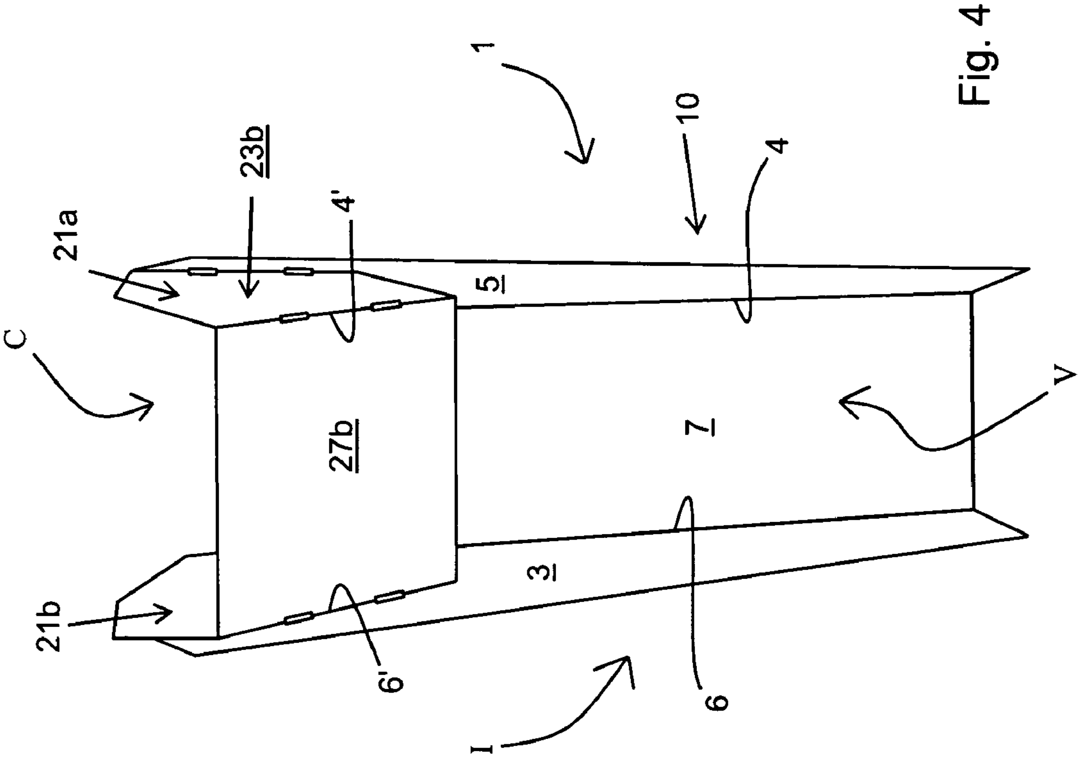
FIG. 4 is a rear elevational perspective view of the back side of the chute apparatus folded.

FIG. 4 shows the back surfaces of the chute apparatus 1 with these back surfaces denoted with the letter b to indicate the opposite surface to the surfaces shown and indicated in FIGS. 2 and 3. FIG. 4 shows clearly how the upper chute portion C defines the path for the debris to enter into the collection container and how the folded panels 3, 5 and 7 define a partial box inside the container and hold the bag open so that sufficient volume V is available for debris collection. By forming the chute apparatus 1 from the single sheet of material 10 the chute apparatus 1 can be folded into a stable 3-dimensional insert to facilitate debris collections and then be flattened again into a planar configuration as shown in FIG. 1 to easily store in a minimal amount of storage space.

Figure 5:
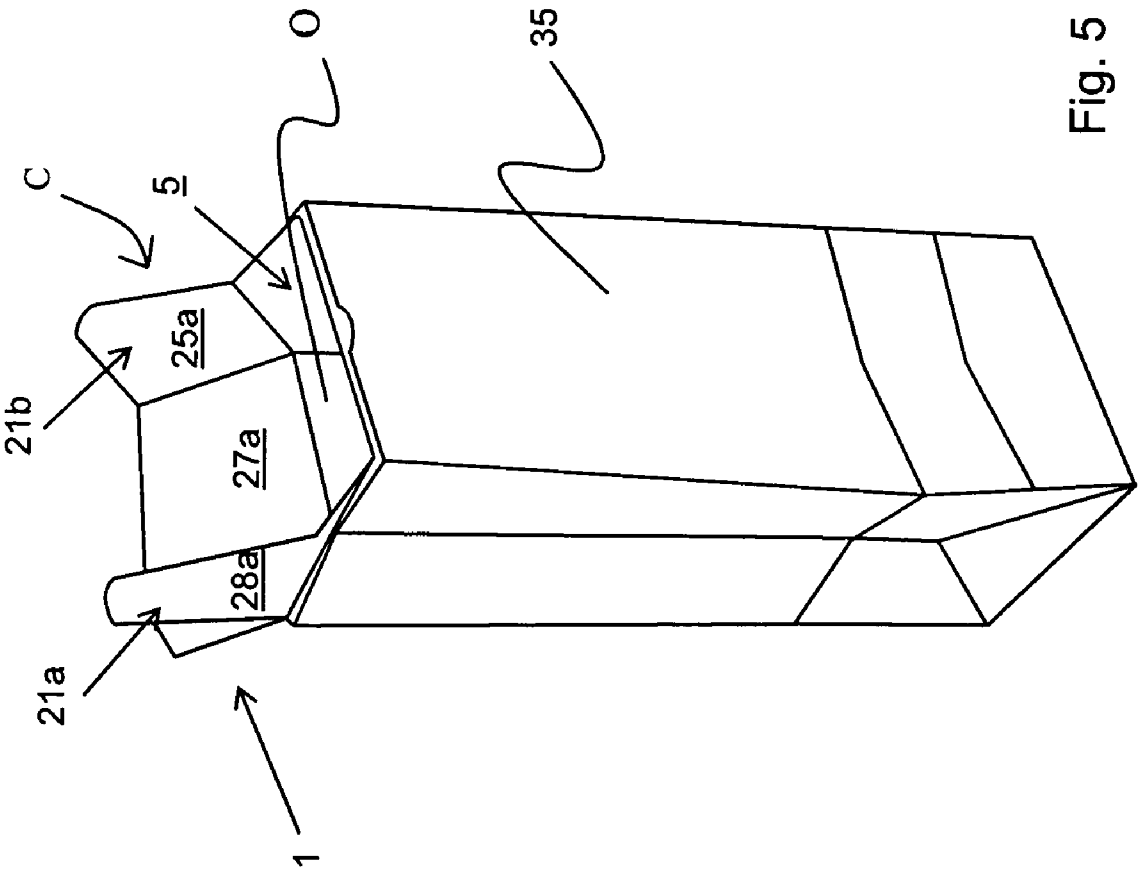
FIG. 5 is a perspective view of the chute apparatus inserted in a flexible container.
Figure 6:
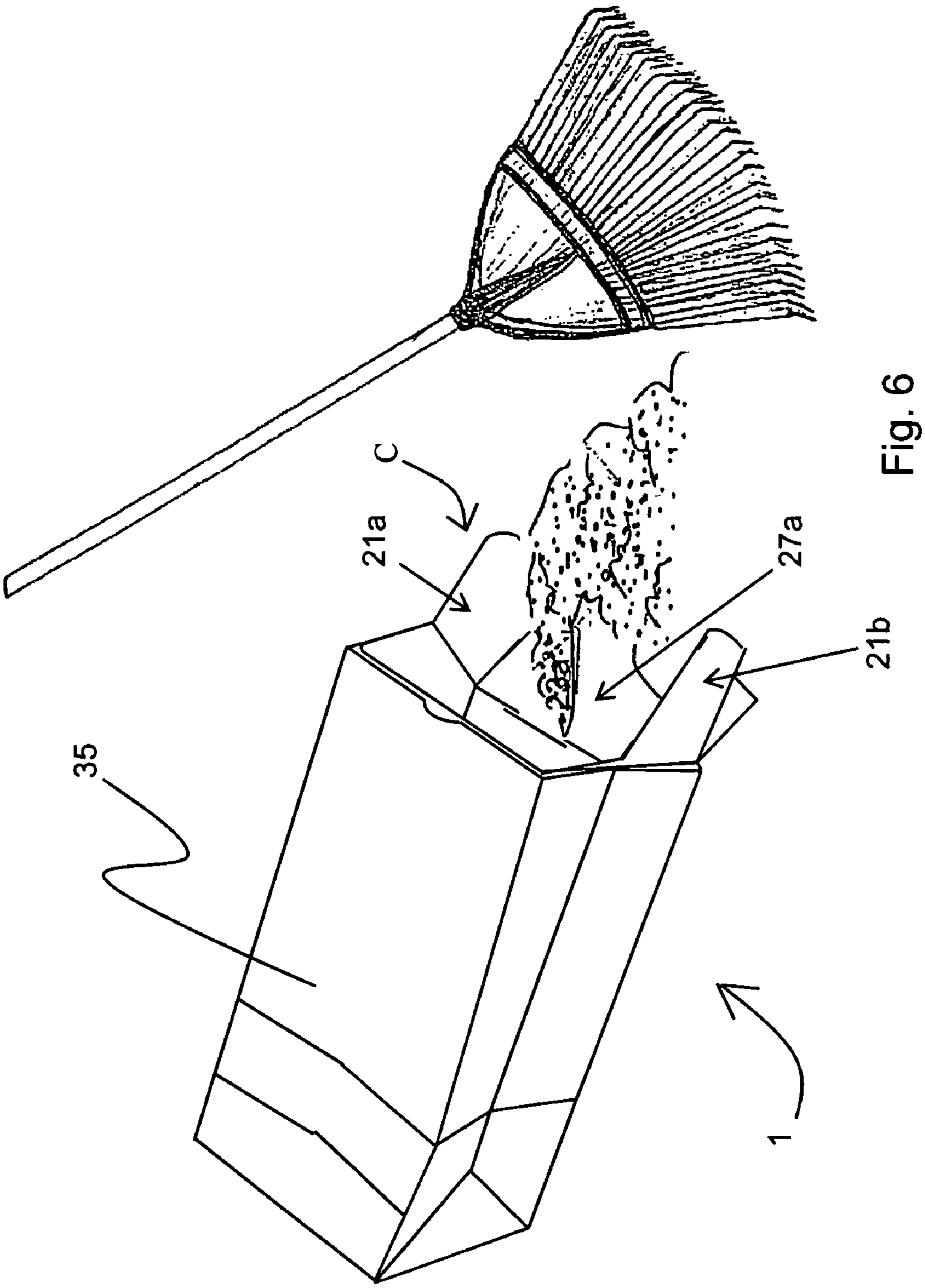
FIG. 6 is a perspective view of the chute apparatus within a flexible container in a laying down prone position.

FIG. 5 shows the chute apparatus 1 in one embodiment being inserted into a flexible container in the form of a paper bag 35. The folded panels 3, 5 and 7 which make up the lower insert portion I are inserted into the paper bag and due to their rigidity and elasticity from the inherent properties of the material, and by the alignment the flutes as discussed above, push out on the paper bag 35 forming a stable support to allow the paper bag 35 to stay open in an upright position or even in a prone position as seen in FIG. 6. In either event, the center surface 27*a* of the chute portion C directs debris through the opening O and into the paper bag 35. In an upright position the stability of the chute apparatus 1 allows heavy debris to be scooped against the chute portion C and directed into the paper bag 35 and allows the debris to be highly compressed within the paper bag 35 without deforming or tearing the bag. The ability to compress debris or other material collected in the paper bag or other container allows fewer flexible containers to be used to collect debris. In the prone position, the chute apparatus 1 holds the paper bag 35 in an open position to allow raking of leaves or debris directly into the paper bag 35 much like a dustpan and broom operation and the opening is maintained open and the bag does not collapse so that the bag can be readily filled with debris.

Figure 7:
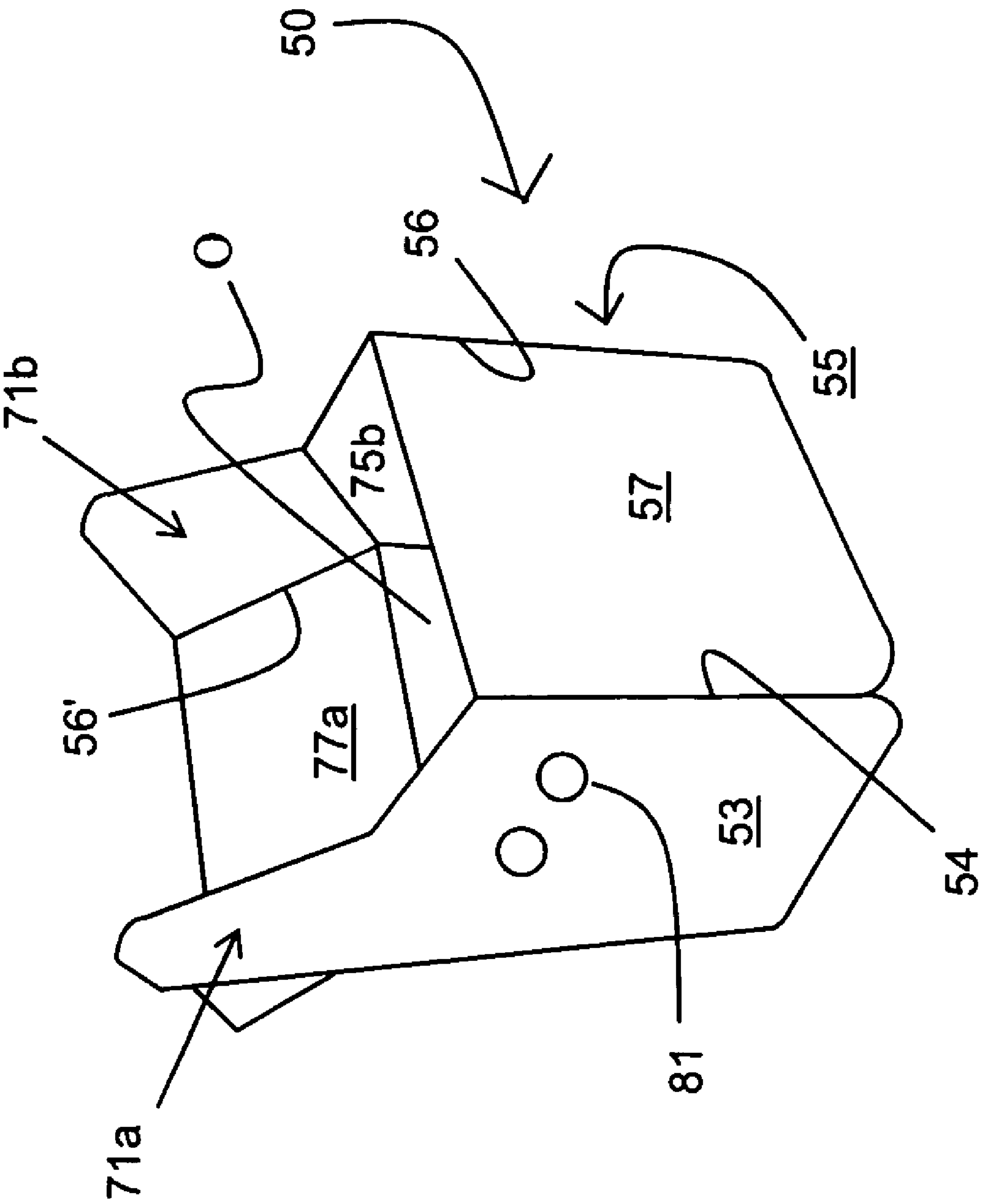
FIG. 7 is a perspective view of a further embodiment of the chute apparatus with a shorter insert portion to facilitate use in a shorter container.

A further embodiment of the invention is shown in FIG. 7 with different but relatively conforming reference numbers corresponding to those in the previous discussed embodiments. This embodiment of a chute apparatus 50 is formed from a single sheet of material but has a reduction in the length of the insert portion I to allow the chute apparatus 50 to be placed in a box container for debris or recycled materials. In this way cans or bottle can be tossed onto the surface 77*a* of the chute portion C of the chute apparatus 50 and be directed down into a box or other flexible container allowing filling of the container without mess or breakage. It is to be appreciated that when the bag, box or other container is full with recycling, or yard waste debris for example the user than merely pulls the chute apparatus directly out of the container and the debris and/or container are ready for pick-up or disposal and the chute apparatus is ready immediately to be folded flat for storage or reused with another container.

The invention has been described in detail with particular reference to certain preferred embodiments thereof, but it will be understood that variations and modifications can be effected within the spirit and scope of the invention.

We claim:

1. A chute apparatus for facilitating the collection of debris within a receiving container comprising:

a single sheet of material having first and second scores formed therein extending the length of the single sheet of material to define a respective first and second fold axes;

a first, second and third adjacent panels defined by the first and second scores;

a cut formed perpendicular to the first and second scores and extending from a first end position in the first panel across the second panel to a second end position in the third panel;

a first angular score extending from a first intersection with the cut in the first panel to an outer edge of the single sheet of material, and a second angular score extending from a second intersection with the cut in the third panel to the outer edge of the single sheet of material; and wherein a portion of the first and second scores and the cut define an upper chute portion of the chute apparatus and the remaining portion of the first and second scores and the first, second and third panels form a lower insert portion of the chute apparatus.

2. The chute apparatus as set forth in claim 1 wherein the upper chute portion of the apparatus defines a passage that is angularly aligned relative to a longitudinal passage defined by the lower insert portion of the chute apparatus.

3. The chute apparatus as set forth in claim 2 wherein a plurality of die cuts are formed in at least one of the first and second angular scores and the first and second scores to facilitate bending of the single sheet of material along the respective score lines.

4. The chute apparatus as set forth in claim 3 wherein the chute apparatus is formed from a corrugated material having a plurality of longitudinal flutes forming the single sheet of material and the longitudinal flutes are aligned perpendicular to the first and second scores defining the first, second and third adjacent panels of the chute apparatus.

5. The chute apparatus as set forth in claim 4 wherein the first and second scores are each formed by a pair of spaced apart but immediately adjacent parallel indentations in the single sheet of material.

6. The chute apparatus as set forth in claim 5 wherein the die cuts which facilitate bending of the apparatus are formed directly between the pair of spaced apart but immediately adjacent parallel indentations forming at least one of the first and second angular scores and the first and second scores.

7. The chute apparatus as set forth in claim 1 wherein the angular scores extend from the cut to oppositely disposed corners formed in the outer edge of the single sheet of material.

8. The chute apparatus as set forth in claim 7 wherein each of the oppositely disposed corners is defined by a portion of the outer edge of the single sheet of material being cut at an obtuse angle where the apex of the obtuse angle forms the respective corners.

9. A method of making a chute apparatus for facilitating the collection of debris within a receiving container comprising the steps of:

forming a single sheet of material having first and second scores formed therein extending the length of the single sheet of material to define a respective first and second fold axes;

defining a first, second and third adjacent panels by the first and second scores;

forming a cut perpendicular to the first and second scores and extending from a first end position in the first panel across the second panel to a second end position in the third panel;

indenting a first angular score extending from a first intersection with the cut in the first panel to an outer edge of the single sheet of material, and a second angular score extending from a second intersection with the cut in the third panel to the outer edge of the single sheet of material; and bending a portion of the first and second scores, adjacent the cut to define an upper chute portion of the chute apparatus and bending the remaining portion of the first and second scores and the first, second and third panels to form a lower insert portion of the chute apparatus.

10. The method of making the chute apparatus as set forth in claim 9 further comprising the step of forming the upper chute portion of the apparatus to define a passage that is angularly aligned relative to a longitudinal passage defined by the lower insert portion of the chute apparatus.

11. The method of making the chute apparatus as set forth in claim 10 further comprising the steps of forming a plurality of die cuts in at least one of the first and second angular scores and the first and second scores to facilitate bending of the single sheet of material along the respective score lines.

12. The method of making the chute apparatus as set forth in claim 11 further comprising the steps of forming the chute apparatus from a corrugated material having a plurality of longitudinal flutes forming the single sheet of material and aligning the longitudinal flutes perpendicular to the first and second scores defining the first, second and third adjacent panels of the chute apparatus.

13. The method of making the chute apparatus as set forth in claim 12 further comprising the steps of forming each of the first and second scores by a pair of spaced apart but immediately adjacent parallel indentations in the single sheet of material.

14. The method of making the chute apparatus as set forth in claim 11 further comprising the step of cutting the die cuts which facilitate bending of the apparatus directly between the pair of spaced apart but immediately adjacent parallel indentations forming at least one of the first and second angular scores and the first and second scores.

15. The method of making the chute apparatus as set forth in claim 9 further comprising the step of forming the angular scores to extend from the cut to oppositely disposed corners formed in the outer edge of the single sheet of material.

16. The method of making the chute apparatus as set forth in claim 15 further comprising the steps of forming each of the oppositely disposed corners by cutting a portion of the outer edge of the single sheet of material at an obtuse angle where the apex of the obtuse angle forms each of the respective oppositely disposed corners.

17. A chute apparatus for facilitating the collection of debris within a receiving container comprising:

a single sheet of material having first and second scores formed therein extending the length of the single sheet of material to define a respective first and second fold axes;

a first, second and third adjacent panels defined by the first and second scores;

a cut formed perpendicular to the first and second scores and extending from a first end position in the first panel across the second panel to a second end position in the third panel;

a first angular score extending from a first intersection with the cut in the first panel to an outer edge of the single sheet of material, and a second angular score extending from a second intersection with the cut in the third panel to the outer edge of the single sheet of material;

a portion of the first and second scores and the cut define an upper chute portion of the chute apparatus and the remaining portion of the first and second scores and the first, second and third panels form a lower insert portion of the chute apparatus;

a plurality of die cut openings are formed in at least one of the first and second angular scores and the first and second scores to facilitate bending of the single sheet of material along the respective angular score lines; and wherein the first and second scores are each formed by a pair of spaced apart but immediately adjacent parallel indentations in the single sheet of material and the die cut openings which facilitate bending of the apparatus are formed directly extending between the pair of spaced apart but immediately adjacent parallel indentations forming at least one of the first and second angular scores and the first and second scores.

18. A chute apparatus for facilitating the collection of debris within a receiving container comprising:

a single sheet of material having first and second scores formed therein extending the length of the single sheet of material to define a respective first and second fold axes;

a first, second and third adjacent panels defined by the first and second scores;

a cut formed perpendicular to the first and second scores and extending from a first end position in the first panel across the second panel to a second end position in the third panel;

a first angular score extending from a first intersection with the cut in the first panel to an outer edge of the single sheet of material, and a second angular score extending from a second intersection with the cut in the third panel to the outer edge of the single sheet of material; a portion of the first and second scores and the cut define an upper chute portion of the chute apparatus and the remaining portion of the first and second scores and the first, second and third panels form a lower insert portion of the chute apparatus;

a die cut opening is formed intermediate between the intersection with the cut and the outer edge of the single sheet of material along at least one of the first and second angular scores to facilitate bending of the single sheet of material along the angular score; and wherein each angular score extends from the cut to an apex of a corner formed in the outer edge of the single sheet of material and the corner is defined by an inwardly depending portion of the outer edge of the single sheet of material formed at an obtuse angle relative to the apex.

* * * * *